US008643892B2

(12) United States Patent  
Jacobs et al.

(10) Patent No.: US 8,643,892 B2
(45) Date of Patent: Feb. 4, 2014

(54) USER CONFIGURED PAGE CHROMATICITY DETERMINATION AND SPLITTING METHOD

(75) Inventors: William S. Jacobs, Los Angeles, CA (US); Michael E. Farrell, Ontario, NY (US); John P. Monahan, Los Angeles, CA (US); David C. Robinson, Penfield, NY (US); David E. Rumph, Pasadena, CA (US); Terry C. Wells, Long Beach, CA (US)

(73) Assignee: Xerox Corporation, Norwalk, CT (US)

( * ) Notice: Subject to any disclaimer, the term of this patent is extended or adjusted under 35 U.S.C. 154(b) by 2641 days.

(21) Appl. No.: 11/214,393

(22) Filed: Aug. 29, 2005

(65) Prior Publication Data

US 2007/0046957 A1   Mar. 1, 2007

(51) Int. Cl.
*G06F 15/00* (2006.01)

(52) U.S. Cl.
USPC ............ 358/1.9; 358/530; 358/1.15; 382/165

(58) Field of Classification Search
USPC ........................... 358/1.15, 1.9, 530; 382/165
See application file for complete search history.

(56) References Cited

U.S. PATENT DOCUMENTS

| 5,568,248 | A | * | 10/1996 | Wagley ........................ 399/156 |
| 6,029,023 | A | * | 2/2000 | Munemori et al. ............. 399/66 |
| 6,041,200 | A | | 3/2000 | Glass |
| 6,185,013 | B1 | * | 2/2001 | Harrington et al. ........... 358/520 |
| 6,302,522 | B1 | * | 10/2001 | Rumph et al. ................. 347/43 |
| 6,718,878 | B2 | * | 4/2004 | Grosso et al. ................. 101/484 |
| 7,359,079 | B2 | * | 4/2008 | Miyahara ..................... 358/1.15 |

OTHER PUBLICATIONS

"EFI Performs Print Management Balancing Act", *Printing Talk*, Feb. 27, 2004, pp. 1-2, http://www.printingtalk.com/news/efi/efi110.html.
*International Color Consortium*, http://www.color.org/, pp. 1-2; "Information on Profiles", Jul. 29, 2005, pp. 1-4, http://www.color.org/profile.html.
Nassar, Nassib, "Automating PDF Objects for Interactive Publishing", *New Architect*, 1998, pp. 1-8, http://www.webtechniques.com/archives/1998/10/nassar/.
Kerr, Douglas A. P.E., "Chromaticity and Chrominance in Color Definition", Aug. 9, 2003, pp. 1-4, Issue 3.

* cited by examiner

*Primary Examiner* — King Poon
*Assistant Examiner* — Jamares Q Washington
(74) *Attorney, Agent, or Firm* — Fay Sharpe LLP

(57) ABSTRACT

A method and system for determining chromatic content of a page of an electronic document. Object level color analysis is performed on a page of the electronic document to determine whether the page is chromatic, achromatic or has highlight color, based on the object level color analysis. The page is then classified as chromatic, achromatic or highlight color, based on the results of the determination.

20 Claims, 9 Drawing Sheets

126 ⇘

SECOND EXAMPLE OF HOW TO DETERMINE IF OBJECT REQUIRES HLC RENDERING

| ANALYZE THE COLOR CONVERTED RGB OBJECT | — 128 |

↓

| IF THE NON R=G=B VALUES HAVE THE SAME PROPORTION THROUGHOUT THE OBJECT, WITHIN A PRE-SET TOLERANCE, LABEL THE OBJECT AS HLC | — 130 |

↓

| DETERMINE THE APPROPRIATE HLC BY COMPARING THE CALCULATED VALUE WITH REFERENCE HLC RGB (FOR THE RGB COLOR SPACE) VALUES FOR HLC PRINTERS | — 132 |

↓

| THE HLC YIELDING THE LOWEST RGB ERROR IS THE APPROPRIATE HLC (E.G., RED OR GREEN) | — 134 |

THIRD EXAMPLE OF HOW TO DETERMINE IF OBJECT REQUIRES HLC RENDERING

| ANALYZE THE COLOR CONVERTED CMYK OBJECT | — 138 |

↓

| IF THE NON C=M=Y VALUES HAVE THE SAME PROPORTION THROUGHOUT THE OBJECT, WITHIN A PRE-SET TOLERANCE, LABEL THE OBJECT AS HLC | — 140 |

↓

| DETERMINE THE APPROPRIATE HLC BY COMPARING THE CALCULATED VALUE WITH REFERENCE HLC CMY (FOR THE CMYK COLOR SPACE) VALUES FOR HLC PRINTERS | — 142 |

↓

| THE HLC YIELDING THE LOWEST CMY ERROR IS THE APPROPRIATE HLC (E.G., RED OR GREEN) | — 144 |

FIG. 12

USER CONFIGURED PAGE CHROMATICITY DETERMINATION AND SPLITTING METHOD

BACKGROUND

The present exemplary embodiment relates to a system for determining if a document page includes color, highlight color, or is achromatic or monochrome (e.g., black-and-white). In particular, the exemplary embodiment detects different color formats and splits the responsibility for their imaging accordingly to allow for efficient imaging.

Photocopiers, fax machines, scanners, electronic displays and printers have become an indispensable part of most offices, and are becoming increasingly popular for personal use as well. Color printers, including laser printers, can provide high quality text and graphic images on various document substrates, including paper and transparencies. Moreover, recently digital document processing systems, which employ printing, faxing, scanning and photocopying capabilities, have become popular.

However, existing systems have a relatively high per-page operating cost when printing color. In practice, a user may wish to print a document that has mostly black-and-white pages, and only a few color pages. For example, in a document such as a report or business plan, color pages may be used for the cover page, the first page of the different sections in the report, and for various graphs which are interspersed among a large number of black-and-white text pages. Accordingly, it is inefficient to print such a document on a color printer or photocopier when most of the pages in the document are black-and-white.

In contrast, conventional black-and-white printer or photocopiers can produce a large number of photocopies very economically. However, of course, such printers or photocopiers cannot provide color documents.

If a user desires to print several sets of a document, where the document includes both black-and-white and color pages, the user may print out one complete document, remove the black-and-white pages, and photocopy these pages to provide the necessary number of sets of black-and-white pages. Additionally, the user can print out a corresponding number of sets of the color pages, and manually collate the color pages with the black-and-white pages to form the final sets of documents. However, this procedure is time consuming, tedious and error-prone.

The prior art does include methods for splitting print jobs. A patent by Glass for a "Method and Apparatus for Split Printing of Color And Monochrome Documents," U.S. Pat. No. 6,041,200 dated Mar. 21, 2000 splits print jobs according to chromaticity but does not concern the way page chromaticity will be determined. Also, a patent by Rumph for "Performance Optimization of Monochrome Pages and Color Printing System," U.S. Pat. No. 6,302,522 dated Oct. 16, 2001 is a hardwired chromaticity splitting device within a printer, for splitting jobs between two different rendering paths within the printer.

Job splitting applications currently available for sale (e.g., EFI's Split or the Xerox DocuSP Color Splitter) determine whether an object is color either by rasterizing the submission and searching the resulting image for colored pixels or by searching the page description language submission for color commands. Such methods are slow, error prone, or both.

More particularly, the EFI product performs color splitting by rasterizing an input Portable Document Format (PDF) file and then pixel searches the resulting raster images. If a color pixel is found, the page is adjudged to be a color page. While potentially accurate, clearly both the rasterization and pixel search of every page's image is time consuming.

Further, at a high level, the Xerox DocuSP color splitter solution works as follows: Via Adobe Acrobat, an input PDF is converted to a PostScript file, the PostScript file is scanned for embedded Document Structuring Convention (DSC) page boundary indicators, and, to determine chromatic content, each PostScript page is searched for certain color space operators. Job tickets for both the color and black-and-white printers are generated. The color printer job ticket is used to print the identified color pages, which are then transferred to a black-and-white printer interposer. As the black-and-white engine prints the document, the black-and-white job ticket integrates the already printed direct insert color sheets with the newly printed black-and-white pages.

Further, traditional color splitting software attempts to determine whether pages require color printing capability and then attempts to intelligently segregate the color pages from the black and white pages into separate print jobs. Current color splitters only distinguish between two page types: black-and-white and contone. None recognizes highlight color pages or the specific type of highlight color (HLC).

Accordingly, it would be desirable to provide a system which detects different chromatic formats within documents and directs their printing to the most efficient printer system.

BRIEF DESCRIPTION

A method and system for determining chromatic content of a page of an electronic document. Object level color analysis is performed on a page of the electronic document to determine whether the page is chromatic, achromatic or has highlight color, based on the object level color analysis. The page is then classified as chromatic, achromatic or highlight color, based on the results of the determination.

BRIEF DESCRIPTION OF THE DRAWINGS

FIG. 11 depicts a second process to determine if an object requires HLC rendering; and FIG. 12 depicts a third process to determine if an object requires HLC rendering.

DETAILED DESCRIPTION

Figure 1:
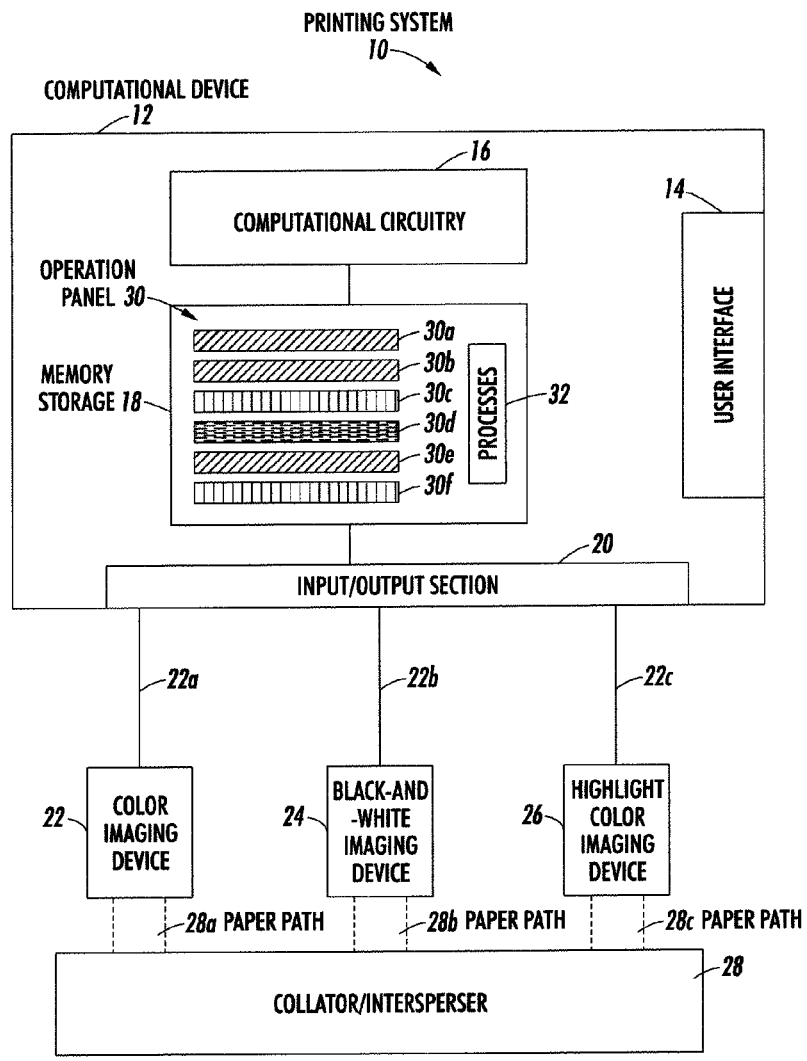
FIG. 1 is a block diagram of a printing system implementing the concepts of the present application.

FIG. 1 illustrates a printing system 10 in accordance with one embodiment of the present concepts. Included is a computational device 12, including a user interface 14, computational circuitry 16, memory storage 18, and an input/output section 20. Computational device 12 is in operative association with at least two of a color imaging device 22, a black-and-white imaging device 24, and a highlight color imaging device 26. The operative connection of these devices is via transmission lines 22a, 22b, and 22c.

It is to be understood that computational device 12 may be a computer, server, personal digital assistant, or any other device having capabilities to permit operation in accordance with the present application. The color imaging device, black-and-white imaging device, and highlight color imaging device may be printers, copiers, electronic displays or other electronic imaging devices. The transmission line 22a, 22b and 22c may be wired, wireless connections, or other appropriate communication paths.

The outputs of color imaging device 22, black-and-white imaging device 24, and highlight color imaging device 26, may be in operational contact with a collator (intersperser) 28, designed to arrange pages from the various imaging devices into a single physical document.

In operation, computational device 12 has in memory storage 18, an electronic document 30 having individual electronic pages 30a-30f. In this particular example, document 30 includes black-and-white pages 30a, 30b, 30e, color pages 30c, 30f and highlight color page 30d. Of course, document 30 may have more or less pages of less formats.

To improve efficiency of the imaging devices, the present embodiments are directed to having the computational device 12 determine if a page of document 30 is a black-and-white page, color page or highlight color page, and thereafter send that page to the most appropriate imaging device. It is understood in the following description, a page is determined to be a color page when any color is detected on the page. A highlight color page is defined as a page which has black and only a single other color, and a black-and-white page is defined as having simply black coloring. As will be explained in greater detail below, a user is provided with the ability to set certain parameters which can more specifically define these definitions. For example, a user may set a range for a page of the document to be considered black-and-white, and if outside that range, the page is considered a color page.

Also stored in memory storage 18 are processes 32, used to analyze the electronic pages to make a determination whether the page is black-and-white, color or highlight color. Once this determination is made, the page is classified, and transmitted to the appropriate imaging device.

User interface 14 is configured to interact with processes 32 to permit the user to set certain parameters in making the determination as to page types. For example, rather than adopting a single-size-fits-all approach, the user is permitted to configure parameters by which the processes classify the pages of electronic document 30. A partial listing of parameters a user may select, include:

(1) The tolerances with which an object's color space will be considered black, white, or neutral;
(2) Whether to treat gray as chromatic or as achromatic;
(3) Whether to treat rich black (i.e., a color in which, to produce a better, richer shade of black, a maximum strength of K is composited with an admixture of other inks (undercolors)) as chromatic;
(4) Whether, when analyzing the chromaticity of content in non-calibrated color spaces (Device RGB, Device CMYK), it is sufficient to examine the color space value(s) alone, or whether the ICC profiles (if available) must also be used to transform the colors into a calibrated space before analysis;
(5) Whether ICC Based colors should be transformed to a calibrated space and checked for chromaticity, or simply assumed to be chromatic (e.g., a true value(s) indicates that colors should be transformed and checked);
(6) Whether, when determining the chromaticity of a raster image object embedded in the page, it is sufficient to examine only the color space of the image or necessary to examine each pixel's color value(s).

Of course, the above listing is to be understood as simply examples of the parameters a user may select to configure operation of processes 32.

Pages 30a-30f of document 30 are, in this embodiment, understood to be generated in a page description language (PDL), such as the Adobe Corporation PDF file format. PDF files are page oriented. Associated with each page are the objects to be imaged on that page and associated with each of these imaged objects is its color space and value(s). In these embodiments, the color space and value(s) are retrieved and used to determine color content quickly and accurately. Thus, the present embodiments teach a manner of determining the color of a page of an electronic document at an object level, where a user may input parameters to control and adjust the way in which processes 32 classify objects as chromatic, achromatic, or as highlight color. Once classified, a page is sent to the appropriate imaging device (22, 24 or 26), for printing, etc. Thus, document 30, in this embodiment, will be split apart based on page classification, printed by the appropriate imaging device, and then re-collated by collator 28, so the physical pages generated from electronic document 30 are in an appropriate sequence. Collator 28 may be connected to imaging devices 22, 24 and 26 by paper paths 28a, 28b and 28c. In this design, the collator has sufficient intelligence to communicate with imaging devices 22, 24, 26 and/or computational device 12 to perform the sequencing operation.

While FIG. 1 shows a color imaging device 22, a black-and-white imaging device 24, and a highlight color imaging device 26, embodiments of these concepts may incorporate less than all three devices. For example, some systems may be designed to include simply the color imaging device and the black-and-white imaging device, while others may incorporate the highlight color imaging device and the black-and-white device. Additionally, printing system 10 of FIG. 1 is shown as having discrete components, such as computational device 12 processes 32, and imaging devices 22, 24 and 26. In other embodiments, various ones of these components may be integrated in a single design, such that printing system 10 is a fully integrated machine.

Figure 2:
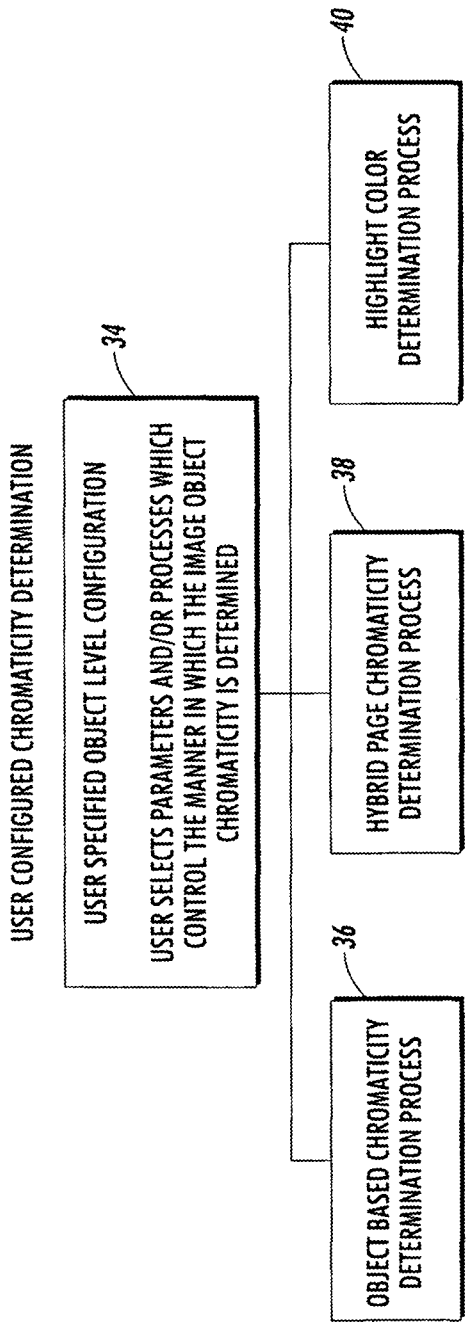
FIG. 2 is an overview of the processes and user selection capabilities in accordance with the present application.

Turning to FIG. 2, set forth is an overview of the processes 32 of the present exemplary embodiments. In step 34, a user will specify object level configurations for the detection and classification of the pages of electronic document 30. This ability permits the user to select parameters which control the manner in which image object chromaticity is determined. In addition, this user selection capability may also be used to select and/or enable a specific process. The processes include areas of commonality, as well as distinct operational characteristics. Particularly, the user may select an object-based chromaticity determination process 36, a hybrid page chromaticity determination process 38, or a highlight color determination process 40. The operation of these processes will be detailed in the following discussion.

Figure 3:
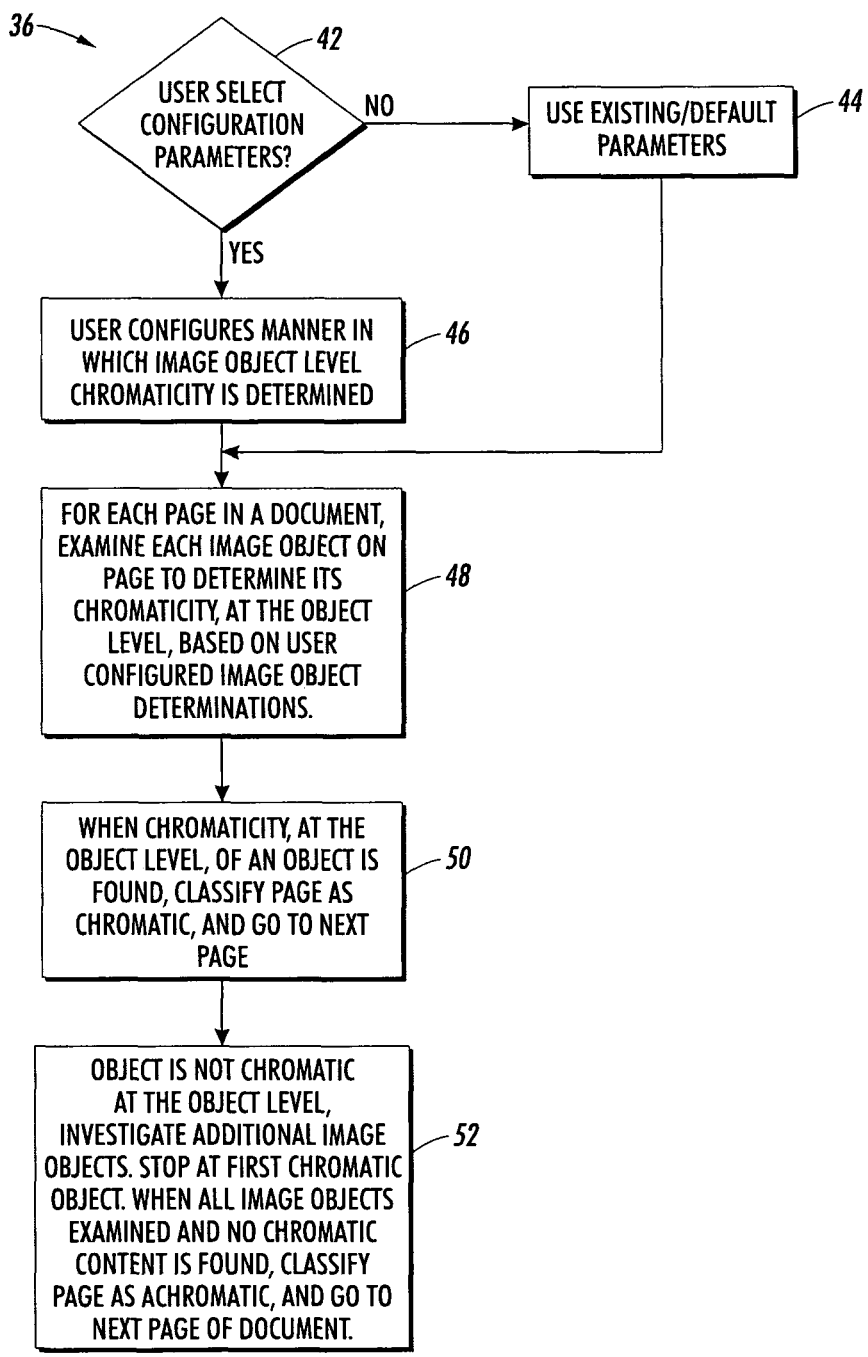
FIG. 3 describes an object-based color determination process.

Turning to FIG. 3, set forth is a flow diagram where the object-based color determination process 36 is considered.

In step 42, the user is provided with an opportunity to input configuration parameters. This concept was discussed previously in connection with FIG. 1, where it was noted the user may select these parameters for a process which determines chromaticity at the object level of a document configured by a page description language. Examples of parameters have previously been described (i.e., see parameter examples 1-6).

If the user declines to input parameters, the process moves to step 44, where existing or default parameters are implemented. If the user, in step 42, decides to enter specific parameters, they are entered at step 46. Once the parameters are input, the process moves to step 48, where for each page in the electronic document, the system examines the image objects on the page to determine its chromaticity based on the user configured image-object determinations. Again, PDF files are page oriented. Therefore, associated with each page are objects to be imaged on that page, and associated with each of these imaged objects is its color space and value(s). These are retrieved and used to determine the color content quickly and accurately.

When, as in step 50, the object is determined to be chromatic (i.e., the object has color content), the entire page is classified as chromatic, and the system moves onto the next page in the document. Thus, it is possible that only a single object needs to be analyzed. If, however, as in step 52, the object is found to not to be chromatic (e.g., is black-and-white), the process investigates additional objects of the page. If no chromatic content is found in any object, the page is classified as achromatic, and the system moves onto the next page of the document. This process is repeated until all pages of the document have been examined. Thus, in this version of the process, the objects on each of the document's pages need only be examined until a first chromatic object is found. At that point, the page is classified as chromatic, and the process proceeds to the next page. Only if no chromatic object is found, will the process review all of the page's imaged objects. If none are chromatic, then the page is classified as achromatic, and the process proceeds to the next page.

Figure 4:
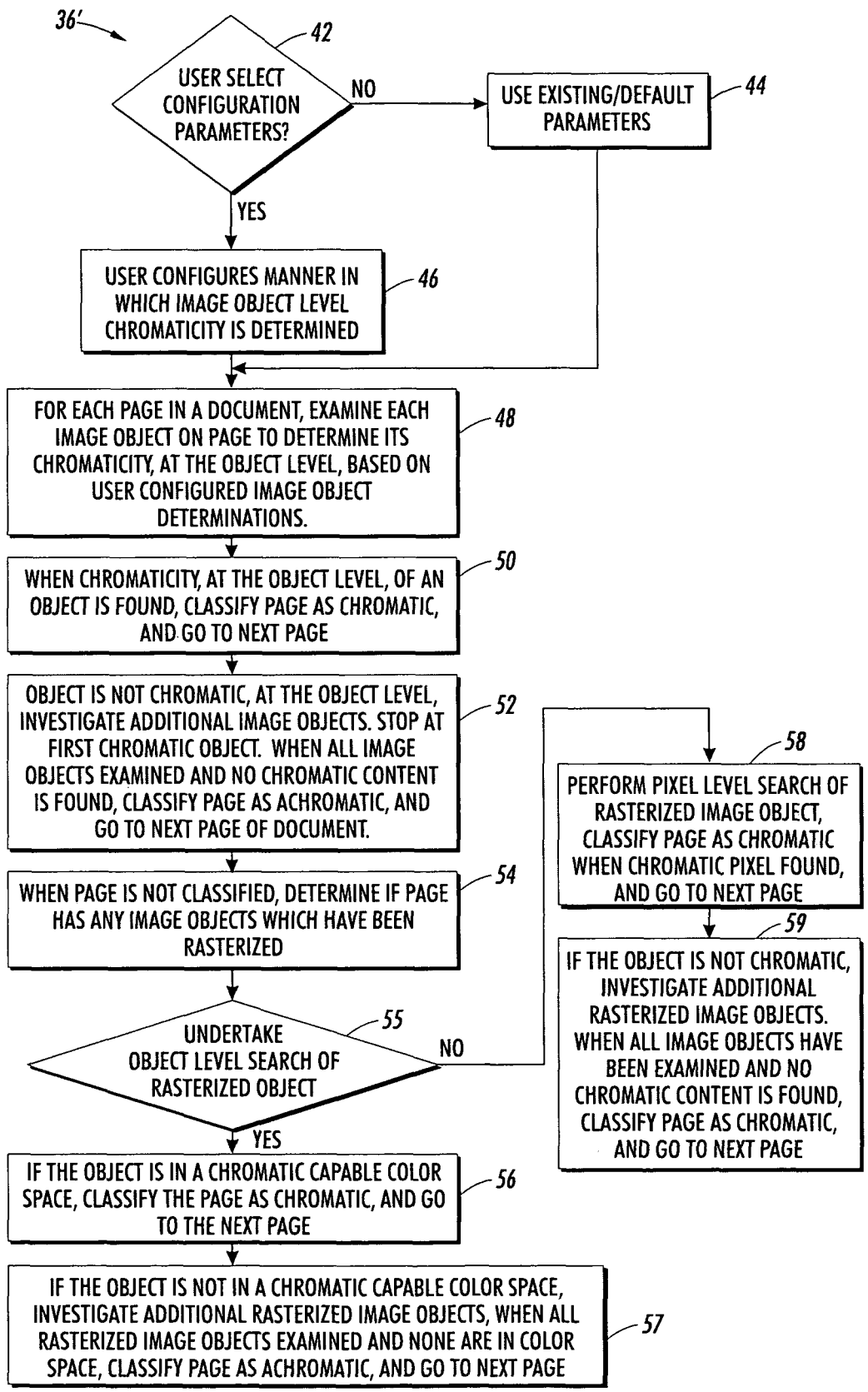
FIG. 4 sets forth a second embodiment of an object-based color determination process.

FIG. 4 illustrates a process 36' similar to the process of FIG. 3, but designed to address a situation where a received page includes one or more embedded PDF image objects which have already been rasterized. In this situation, the process includes steps 54-59, where following step 52, if the page has not been classified a determination is made whether the page includes any rasterized objects 54. If the page does include at least one rasterized object, the process moves to step 55, where a determination is made whether to perform the searching on the rasterized objects at an object level or a pixel level. If searching is to be undertaken at the object level, the process moves to step 56, where a determination is made whether the object is in a color space. If the object is in a chromatic capable color space, the page is classified as chromatic, and the process moves to a next page of the document. If, however, as recited in step 57, the object is not in a chromatic capable color space (e.g., it is a binary document), if any other rasterized objects are in the page, they are investigated to determine whether they are in a color space. When all the rasterized image objects have been examined, and none are found to be in a color space, the page is classified as achromatic, and the process moves on to the next page.

On the other hand, in step 55, if the search is not undertaken at the object level, the process moves to step 58, where a pixel level search is performed on the rasterized image object. When a chromatic pixel is found, the page is classified as chromatic, and the operation moves to the next page of the document. However, if in step 58, no chromatic pixel is found, the object is determined to be achromatic, and the process investigates any additional rasterized image objects in the page. When all rasterized image objects have been examined, and no chromatic content is found, the page is classified as achromatic, and the process goes to the next page of the document.

The determination of whether to undertake searching of the rasterized objects at the object level, or pixel level, as recited in step 55, is a parameter selectable by a user, such as in step 42 of FIG. 4.

Additionally, and in the alternative, whereas the pixel search of step 58 only requires that a first chromatic pixel be detected for classification of the page as chromatic, a user may select parameters which require more than detection of a single color pixel. In this case the user may require a tolerance level of color pixel detection (e.g., more than 10 color pixels), or the user may require that all pixels be analyzed and a certain percentage must be color pixels (e.g., greater than 3% must be color). Of course, other tolerances or searching requirements may be made part of the process. The above examples are provided as simply two alternative examples where a user is given the ability to control the processes.

While the processes of FIGS. 3 and 4 provide unique color splitting concepts, there is an instance where achromatic pages may be misclassified as chromatic pages when the processes described in FIGS. 3 and 4 are implemented. Particularly, it is known that imaging software, such as the Adobe imaging model, builds a page by laying objects from the surface of the page in a Z-order extending out from the page. Thus, a first image object may be on the surface of the page, and a second image object may be located at least partially or fully on top of the first image object. Due to this design, it is possible that a PDF generated page can contain both chromatic and achromatic opaque objects, with the chromatic objects completely overlaid by the achromatic objects. Again, in imaging models such as the Adobe imaging model, the topmost object in the Z-order will determine the final image, implying that all visible pixels will be achromatic. Yet, because some of the overlaid objects have been identified as chromatic, the page may in the embodiments of FIGS. 3 and 4, be erroneously classified as chromatic.

Figure 5:
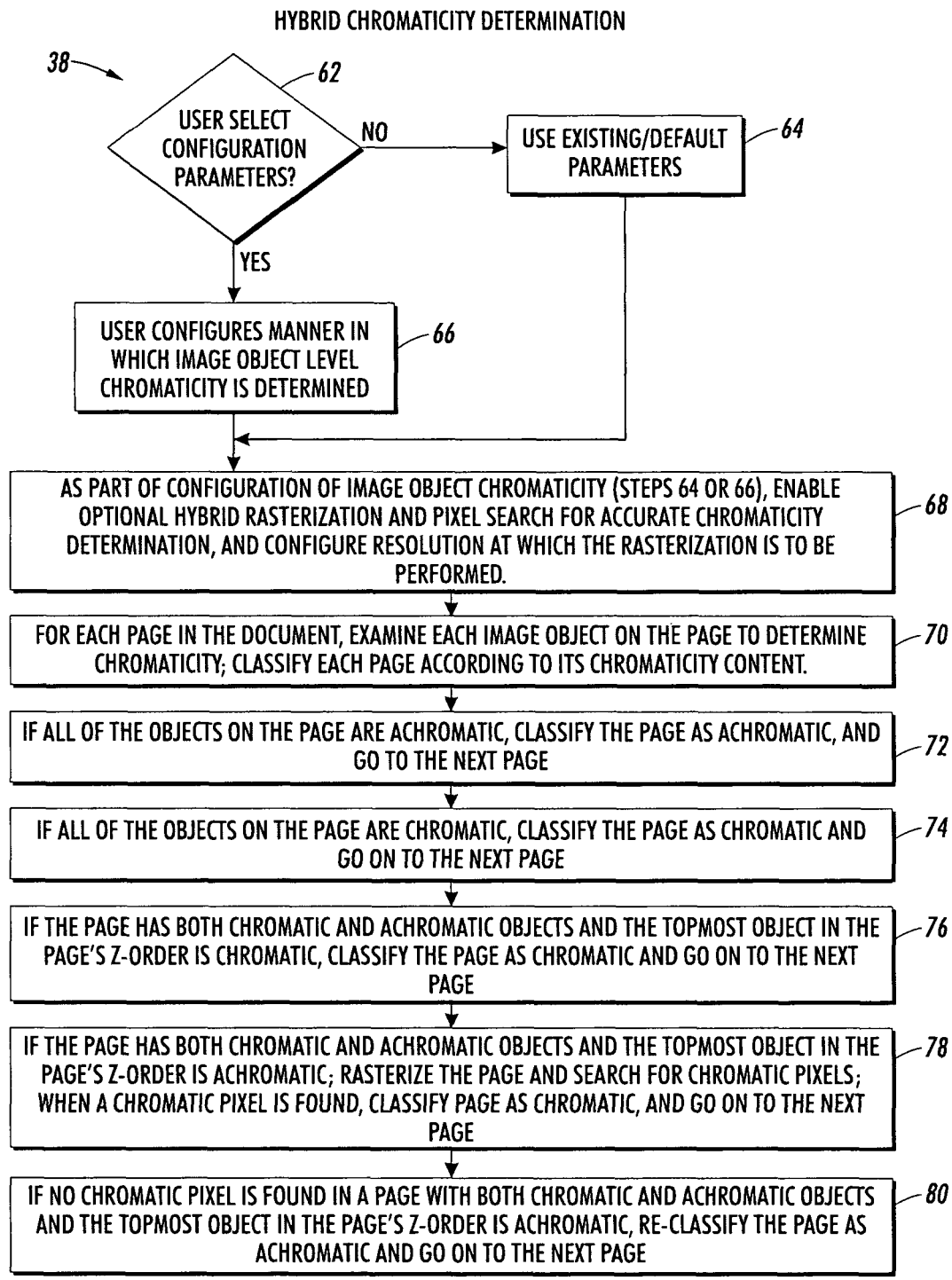
FIG. 5 illustrates a hybrid chromaticity determination process.

One way to avoid such misclassification is to determine which pixels of which objects actually are visible, which, in turn, given irregular object shapes, implies rasterizing the objects and searching their pixels. Hence, for users concerned about such misclassification of achromatic pages as chromatic pages, the embodiment, as depicted in FIG. 5 describes a hybrid process, supplementing the object level chromatic analysis with an optional additional filtering mechanism, in which the page is rasterized, and the resulting pixels are searched for chromatic pixels. When a chromatic pixel is found, the page is classified as chromatic, and no further examination of the page is needed. Clearly, such rasterization and pixel search involves a performance versus accuracy tradeoff (i.e., high rasterization resolutions will increase accuracy, but reduce performance (i.e., speed)).

The hybrid chromaticity determination process 38 of FIG. 5, again provides for a step of user selection of configuration parameters 62, and if user configuration is not selected, the system moves to a default step 64, which uses existing parameters. If the user selection is implemented, such as in step 66, a user may input parameters as appropriate. One particular user parameter which may be implemented is shown in step 68, where the user enables the optional hybrid rasterization and pixel search for chromaticity determination. The user may also, at this step, configure the resolution at which the rasterization is to be performed.

Next, in step 70, for each page in the document, the system will examine each image object on the page to determine chromaticity, and then classify each page according to its chromaticity. More particularly, as described in step 72, if all of the objects of the page are achromatic, the system classifies the page as achromatic and a next page is selected for investigation. If, however, as set out in step 74, all of the objects on the page are chromatic, the process will classify the page as chromatic and then proceed to the next page. By analyzing all the objects and finding them to be either chromatic or achromatic, there is a high level of assurance that misclassification will not occur. Therefore, pages which have all objects either chromatic or achromatic are filtered out of and do not need to be processed under the hybrid portion of the process. Rather, as described in steps 76 and 78, the further processing is for pages which have both chromatic and achromatic objects. In step 76, a determination is made as to whether the topmost object in the page on the page's Z-order is chromatic. If this answer is yes, the system classifies that page as chromatic, and the process moves to review the next page of the document. In step 78, for a page with both chromatic and achromatic objects, and with the topmost object in the page's Z-order being achromatic, the page is rasterized, and a pixel search is undertaken for chromatic pixels. When a chromatic pixel is found, the page is classified as chromatic, and the next page is then investigated. If, as in step 80, no chromatic pixel is found, the page is classified as achromatic.

By filtering the pages for which rasterization and pixel search are needed, a significant performance savings will result with no loss of accuracy. More specifically, as steps 72 and 74 filter out pages which have a high level of certainty of being correctly classified, then the additional object and pixel searching is undertaken with a filtered page subset of the pages for the full document. Again, pages in the filtered subset will have both chromatic and achromatic subjects. The purpose and value(s) of restricting rasterization and pixel search to those pages containing at least one chromatic and one achromatic object directly derives from the difficulty being addressed, namely the misclassification of achromatic pages with hidden chromatic objects. Clearly, this situation arises only if a page has only both chromatic and achromatic objects. Hence, determining that all of the objects on the page are chromatic or achromatic is sufficient to show definitively that the page is respectively chromatic or achromatic. Thus, in these cases, rasterization and pixel search will not be necessary.

A similar point explains the further restriction of rasterization and pixel search to those pages whose highest level object is achromatic. The problem of misclassification of achromatic pages as chromatic results from the possible presence of fully hidden chromatic objects. In the Adobe imaging model, for example, an image of a page is generated by imaging successive objects, one on top of another, i.e., in a Z-order determined by the order of objects on the page. The object at the bottom will be imaged first, the object immediately above it, next, and so on, up to the object at the top, which is imaged last. As a result, the object at the top of the Z-order will always be visible. If that object is chromatic, the implication is that it will not be hidden. Hence, if that object is chromatic, it will be visible, and the page will be chromatic. Only when all the chromatic objects are hidden is rasterization and pixel search needed, a case that can only happen when the highest level Z-order object is achromatic. The objects being investigated include their location in the Z-order. Therefore, the present embodiments use this information to determine the topmost object.

Figure 6:
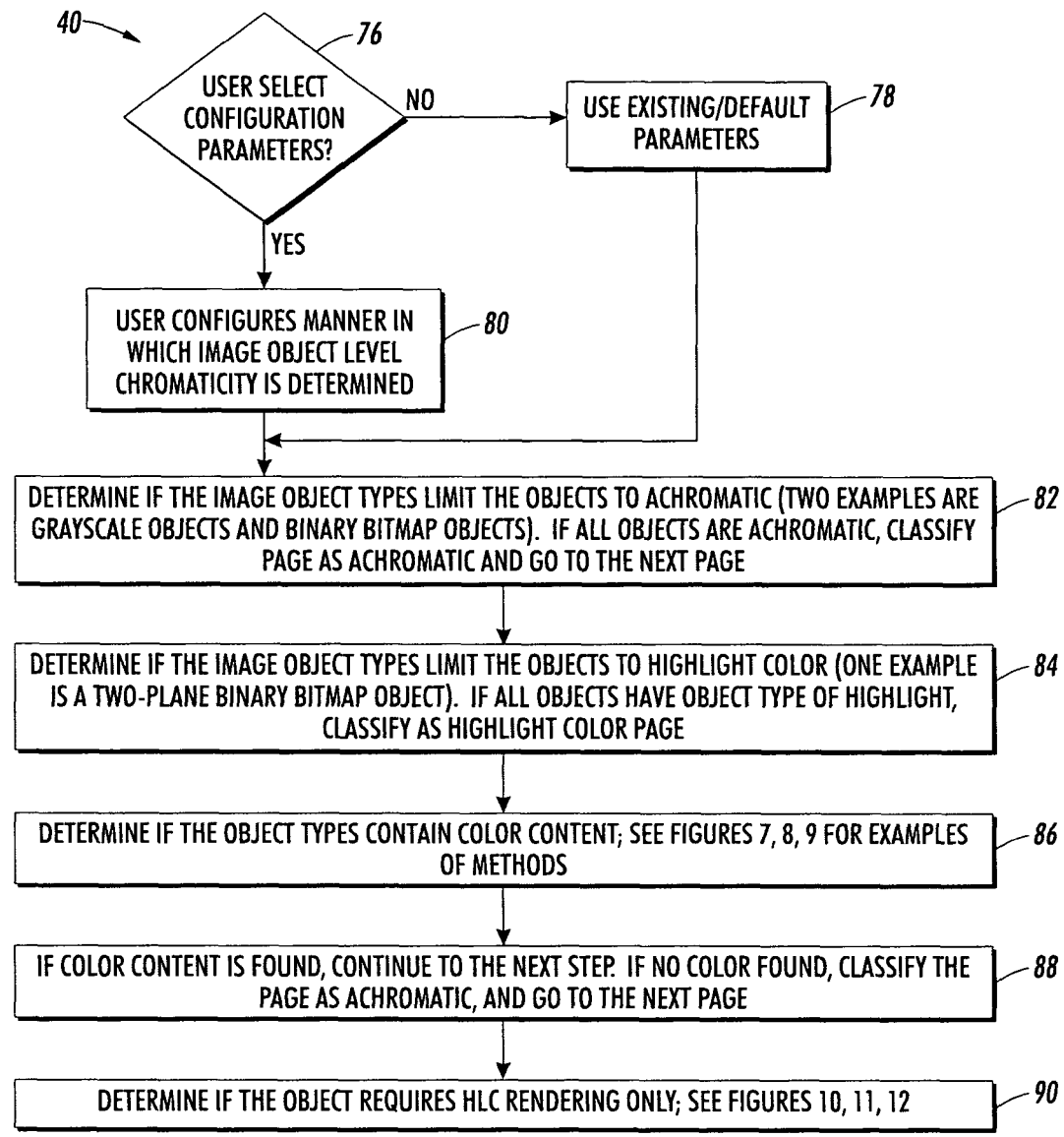
FIG. 6 illustrates a highlight color determination process.

Turning to FIG. 6, illustrated is a highlight color determination process 40 in accordance with a further embodiment of the present application. The previous discussions have focused on determinations between a page which may be black-and-white and one which may have color. Another imaging device, known as a highlight color imaging device, generates an image having black colorant and one other colorant. Therefore, this embodiment incorporates not only a determination between color and black-and-white, but also provides for a determination whether the page is appropriate for the submission to a highlight color imaging device.

Again, and similar to the previous embodiments, provided is capability for a user to input configuring parameters for the operation of the process 76. If the user declines to provide parameters, existing default parameters will be used 78. However, if the user does set parameters, the process may be configured as in step 80. Initially, the process determines in step 82, if the image object types limit the objects of the page to being achromatic. Examples of such object types are gray scale objects and binary bitmap objects. If the object types are limited to only achromatic types, the page is classified as achromatic, and the system moves to a next page. In step 84, a determination is made whether the image object types of the page limit the objects to being only highlight color 84. One example of an object of this type is a two-plane binary bitmap object. If all objects have object types limited to only highlight color, the page is classified as a highlight color page. Thus, if all pages of the document are classified in accordance with steps 82 and 84, the process classifies all the pages of the document as appropriate.

However, as defined in step 86, if it is determined the object types may be chromatic (i.e., contain color content), the process operates to determines if color exists. At this point, step 86 of process 40 for determining chromaticity may be implemented, in accordance with the showings of FIGS. 7, 8 and 9. Alternatively, previously described processes for determining chromaticity (i.e., FIGS. 3, 4, 5) may also be used, among others. In step 88, if chromaticity is found (via step 86), the process moves to the next step (i.e., step 90). However, if no chromaticity is found, the page is classified as achromatic, and the next page will be investigated. In step 90 (i.e., color content has been found), a determination is made as to whether the chromaticity of the object requires highlight color rendering only. If such object requires highlight rendering only, the page will be classified as highlight color. Examples of procedures to make this determination are illustrated in FIGS. 10, 11, 12. If, however, after the investigation it is determined the highlight color is not required, the page is classified as color (as described in step 91).

Figure 7:
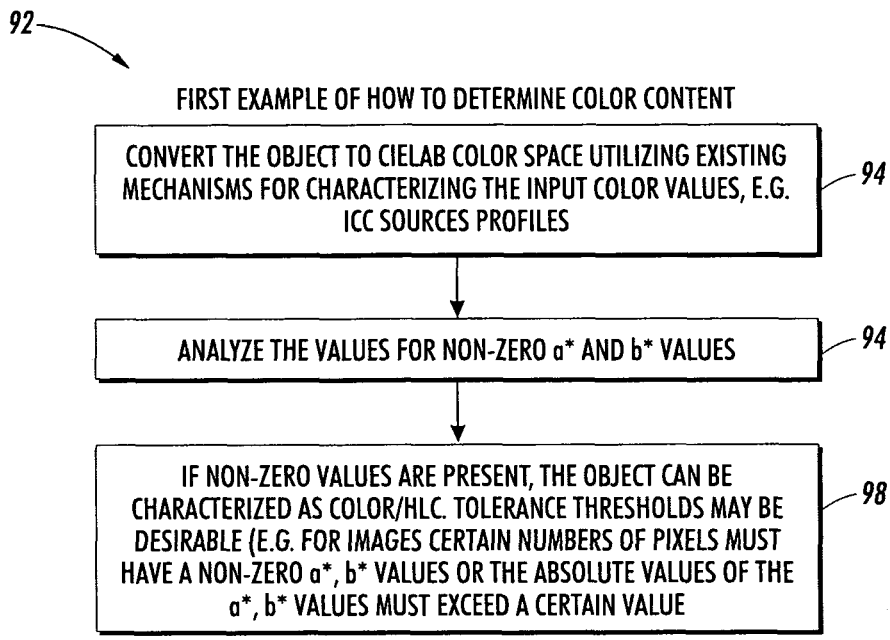
FIG. 7 illustrates a first color content determination process.

Turning to FIG. 7, set forth is a first color content determination process 92 (which may be used for step 86 of FIG. 6). In step 94, the object is converted to CIELAB color space. Such a conversion utilizes existing mechanisms for characterizing the input color value(s), for example, ICC source profiles. Following the conversion, in step 96, the value(s) for non-zero $a^*$ and $b^*$ value(s) are analyzed. If, as set forth in step 98, non-zero value(s) are present, the object can be characterized as color/HLC. It is noted the user may input tolerance threshold parameters for this step. For example, images of certain numbers of pixels may need to have non-zero $a^*$, $b^*$ value(s), or the absolute value(s) of the $a^*$, $b^*$ value(s) must exceed a certain value(s). Again, these are given just as examples of how a user may customize the analysis through the user input parameters.

Figure 8:
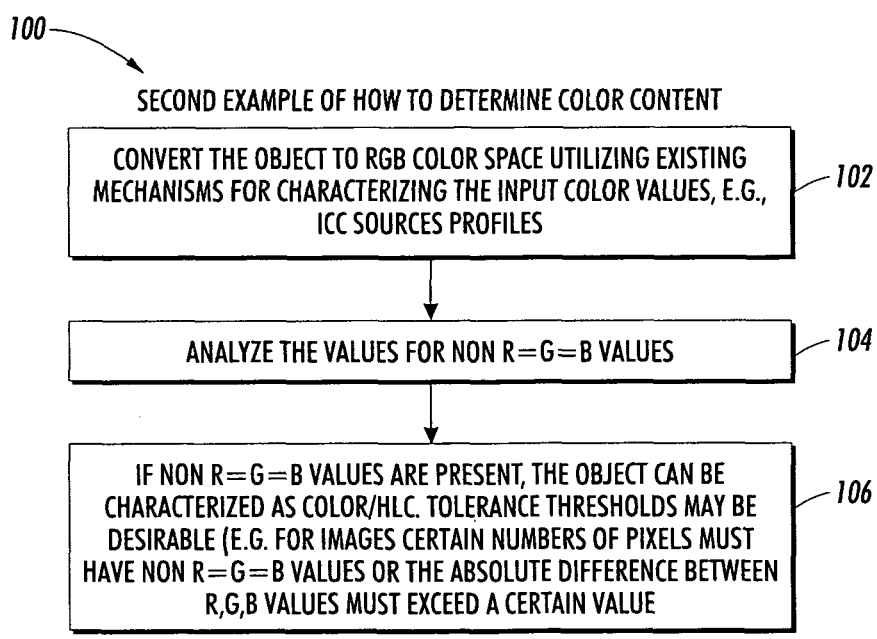
FIG. 8 depicts a second color content determination process.

Turning to FIG. 8, set forth is a second color content determination process 100 (which may be used to perform the operations step 86 of FIG. 6). In step 102, the object is converted to RGB color space, again using existing mechanisms for characterizing the input color value(s), for example, ICC source profiles. In step 104, the value(s) for non $R=G=B$ value(s) are analyzed. Then, as illustrated in step 106, if non $R=G=B$ value(s) are present, the object is characterized as color/HLC. Similar to the discussion in FIG. 7, certain tolerance thresholds may be useful for this characterization. In particular, in this embodiment, for image objects, a parameter may be that a certain number of pixels must have non R=G=B value(s), or the absolute difference between R=G=B must exceed a certain value(s).

Figure 9:
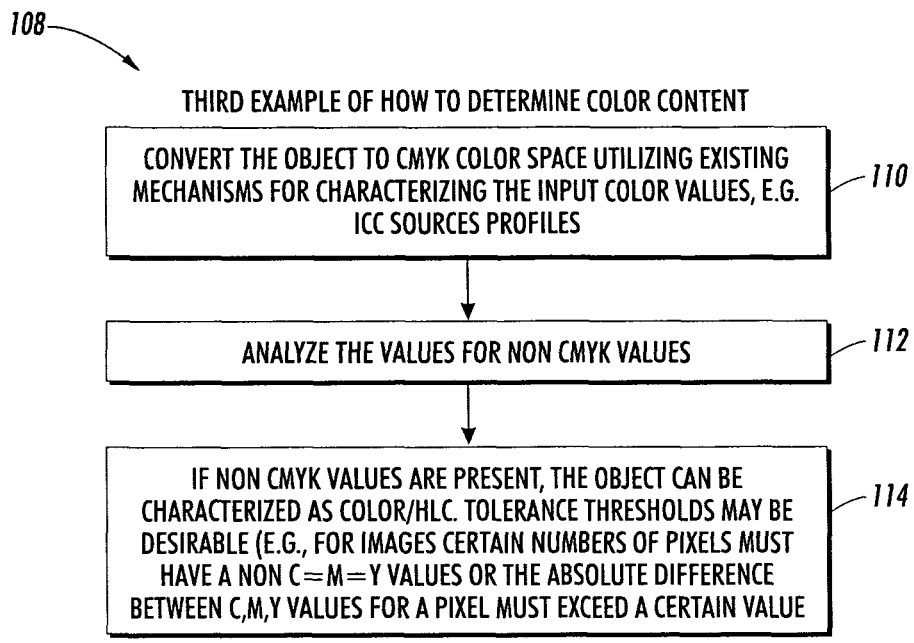
FIG. 9 depicts a third color content determination process.
Figure 10:
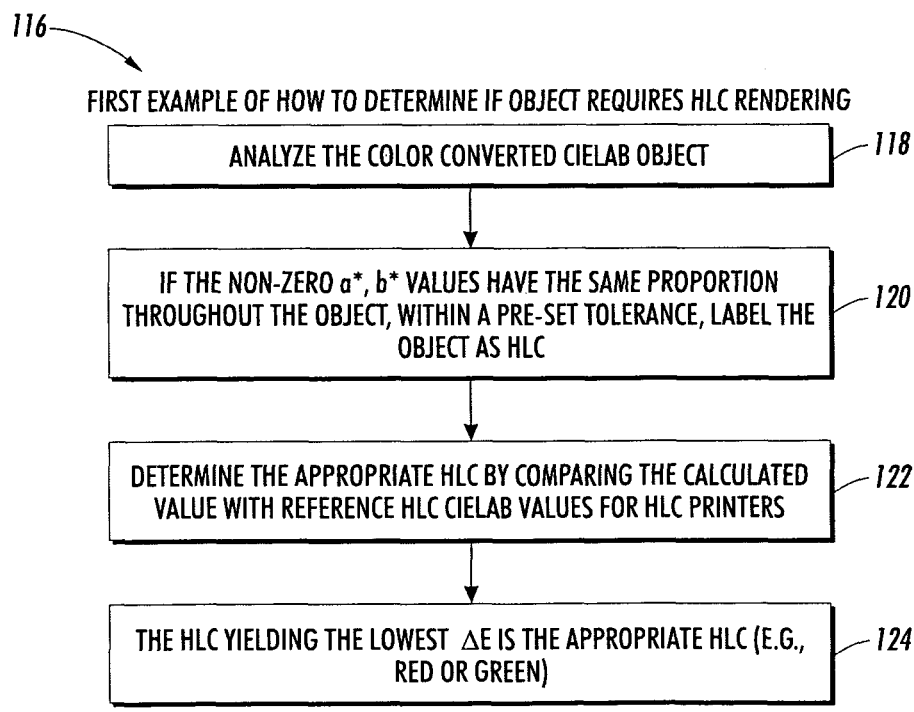
FIG. 10 provides a first process which determines if an object requires HLC rendering.

Turning to FIG. 9, set forth is a third color content determination process 108 (which may be used to perform operations of step 86 of FIG. 6). The object is converted to CMYK color space, utilizing existing mechanisms for characterizing the input color value(s), for example, ICC source profiles. Then in step 112, the value(s) for non C=M=Y value(s) are analyzed. If, as illustrated in step 114, non C=M=Y value(s) are present, the object can be characterized as color/HLC. Again, tolerance thresholds may be useful in this implementation. For example, for images, a certain number of pixels must have non C=M=Y value(s), or the absolute difference between C=M=Y value(s) for a pixel must exceed a certain value(s).

With attention to step 90 of FIG. 6, a determination is made if the object requires HLC rendering only. FIGS. 10, 11 and 12 set forth alternative process flows by which such a determination may be made. These process are used once color content is found (i.e., step 88) based on the color analysis determination (i.e., step 86).

In FIG. 10, a first HLC rendering determination process 116 is illustrated. In step 118, the color converted to the CIELAB object (of FIG. 7) is analyzed. If non-zero a*, b* value(s) have the same proportion throughout the object, within a preset tolerance, the object is labeled as HLC 120. Then, in step 122, the appropriate HLC is determined by comparing the calculated value(s) with reference HLC CIELAB value(s) (for the CIELAB color space) for existing HLC printers (such as Xerox HighLight Color printers). The HLC yielding the lowest ΔE is the appropriate HLC (e.g., red or green) 124.

Turning to FIG. 11, a second HLC rendering determination process 126 is illustrated. In step 128 the color converted to the RGB object (converted in the process of FIG. 8) is analyzed. Then, as described in step 130, if non R=G=B value(s) have the same proportion throughout the object, within a preset tolerance, the object is labeled as HLC. Thereafter, in step 132, the appropriate HLC is determined by comparing the calculated value(s) with reference HLC RGB value(s) (for the RGB color space) for existing HLC printers, such as Xerox HighLight Color printers. Then, as described in step 134, the HLC yielding the lowest RGB error is the appropriate HLC (e.g., red or green).

Turning to FIG. 12, a third HLC rendering determination process 136 is illustrated. In step 138, the color-converted CMYK object (converted in the process of FIG. 9) is analyzed. Then in step 140, it is determined whether non C=M=Y value(s) have the same proportion throughout the object, within a preset tolerance. If such a tolerance exists, the object is labeled as an HLC object. Then in step 142, the appropriate HLC is determined by comparing calculated value(s) with reference HLC CMY (for the CMYK color space) value(s) for existing HLC printers, such as Xerox HighLight Color printers 142. Thereafter, in step 144, the HLC yielding the lowest CMY error is determined to be the appropriate HLC (e.g., red or green).

It is to be appreciated that while the above discussion focused on supporting color split printing, it is also applicable to any other case where differential processing of a document's color, black-and-white or highlight pages is desirable. For example, in the case of automated pre-press workflows, it has been argued that in certain situations, it may be desirable to edit color pages in one way and the black-and-white pages in a different way. To do this, a determination of each page's chromaticity is needed. The processes presented in this application would readily satisfy such a requirement.

It is also to be appreciated that while the invention proposal focuses primarily on a PDF page description language, the approach to chromatic, achromatic and HLC page determination presented here can be applied to any other page description language provided that it meets the requirements (i) that it is structured into identifiable pages, and (ii) that the imaged page content is presented as objects.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of determining chromatic content of a page of an electronic document by using an image generating system, wherein the method comprises:
    performing object level color analysis on image objects of the page of the electronic document of the image generating system;
    determining, by the image generating system, whether the page is chromatic, achromatic or highlight color based on the object level color analysis; and
    classifying, by the image generating system, the page as chromatic, achromatic or highlight color.

2. A method of determining chromatic content of a page of an electronic document by using an image generating system, wherein the method comprises:
    performing object level color analysis on image objects of the page of the electronic document of the image generating system, wherein the object level color analysis is based, at least in part, on user input parameters input to the image generating system;
    determining, by the image generating system, whether the page is chromatic, achromatic or highlight color based on the object level color analysis; and
    classifying, by the image generating system, the page as chromatic, achromatic or highlight color.

3. The method according to claim 2, wherein the user input parameters include threshold values to determine object color.

4. The method according to claim 1, further including:
    prior to the classifying of the page, detecting at least one rasterized image object of the image objects of the page by the image generating system;
    performing by the image generating system pixel level color analysis on pixels of the rasterized image object;
    determining by the image generating system the page is chromatic when a chromatic pixel is detected; and
    determining, by the image generating system, the page is achromatic when all rasterized image objects have been detected and all objects of the page are rasterized and are achromatic.

5. The method according to claim 1, wherein the page is classified, by the image generating system, as achromatic when all objects of the page are achromatic, and the page is classified as chromatic when all of the objects are chromatic.

6. The method according to claim 5, wherein for a page having both chromatic and achromatic objects, further including classifying, by the image generating system, the pages as chromatic when a topmost object in the Z-order of the page is chromatic.

7. The method according to claim 5, wherein for a page having both chromatic and achromatic objects, and a topmost object in a Z-order of the page is achromatic, further including rasterizing, by the image generating system, the objects and classifying, by the image generating system, the page as chromatic when the first chromatic pixel is detected and classifying, by the image generating system, the page as achromatic when no chromatic pixel is detected.

8. The method according to claim 1, further including passing, by the image generating system, the classified page to an image forming device intended to image the classified page.

9. The method according to claim 1, wherein the performing step includes:
 determining, by the image generating system, if object types of the page limit the image objects of the page to only highlight color, and classifying, by the image generating system, the page as highlight color when the object types limit the imaged object types of the page to only highlight colored objects.

10. The method according to claim 9, wherein the performing step further includes:
 determining, by the image generating system, if the object types of the page limit the objects of the page to only achromatic objects, and classifying, by the image generating system, the page as achromatic when the object types limit the imaged object types of the page to only achromatic objects;
 determining, by the image generating system, if at least one of the objects of the page contains color content;
 determining, by the image generating system, if the at least one imaged object, determined to contain color content, requires only highlight rendering, and classifying, by the image generating system, the page as highlight color; and
 determining, by the image generating system, if the at least one imaged object, determined to contain color content, does not require only highlight rendering, and classifying, by the image generating system, the page as color.

11. The method according to claim 10, wherein the step of determining if at least one of the objects of the page contain color content includes, mapping the at least one object to a color space and assessing chromaticity of the at least one object by evaluating the color coordinates.

12. The method according to claim 11, further including determining, by the image generating system, a best matching highlight color of the object.

13. The method according to claim 10, further including configuring, by the image generating system, the color analysis based, at least in part, on user input parameters.

14. The method according to claim 13, wherein the user input parameters include inputting threshold values to determine object color.

15. The method according to claim 10, wherein the object types are PDL object types.

16. An image generating system for determining chromaticity of a page of an electronic document, the system comprising:

a computational device including processes to determine color content of a page of an electronic document and to classify the page as at least one of chromatic, achromatic or highlight color, the processes configured to analyze the page of the electronic document at an object level; and
 a plurality of imaging devices in operational arrangement with the computational device, wherein the computational device forwards the classified page to one of the plurality of imaging devices configured to image pages having format the same as the classified page.

17. The image generating system according to claim 16, further including a user input interface configured for a user to input instructions defining parameters of operation of the processes.

18. The image generating system according to claim 16, further including a collator in connection with at least some of the plurality of imaging devices, the collator collecting physical pages from at least some of the imaging devices and placing the pages into a desired sequence.

19. The image generating system according to claim 16, wherein the object level of the page of the electronic document is a PDL object.

20. An image generating system configured to perform a method for determining chromatic content of a page, configured in a page description language, wherein the method comprises:
 providing the image generating system with user configurable inputs to configure a manner by which chromaticity of the page is determined;
 examining, at the object level, all imaged objects in the page to determine chromaticity of all the imaged objects, by the image generating system;
 proceeding to process, by the image generating system, in accordance with at least one of i-iv, and
  i) if all the imaged objects are chromatic, classifying the page as chromatic,
  ii) if all the imaged objects are achromatic, classifying the page as achromatic,
  (iii) if the page contains chromatic and achromatic imaged objects,
  determining a topmost imaged object in a Z-order of the page, and
  classifying the page as chromatic when the topmost imaged object is determined to be chromatic,
  (iv) if the page contains chromatic and achromatic imaged objects,
  determining the topmost imaged object in the Z-order of the page,
  rasterizing the page when the topmost imaged object is achromatic, searching the rasterized page, and
  proceeding with the process in accordance with at least one of a-b,
 (a) classifying the page as chromatic when a chromatic pixel is found in the searching step, or
 (b) classifying the page as achromatic when no chromatic pixel is found in the search step.

* * * * *